United States Patent Office 2,945,712
Patented July 19, 1960

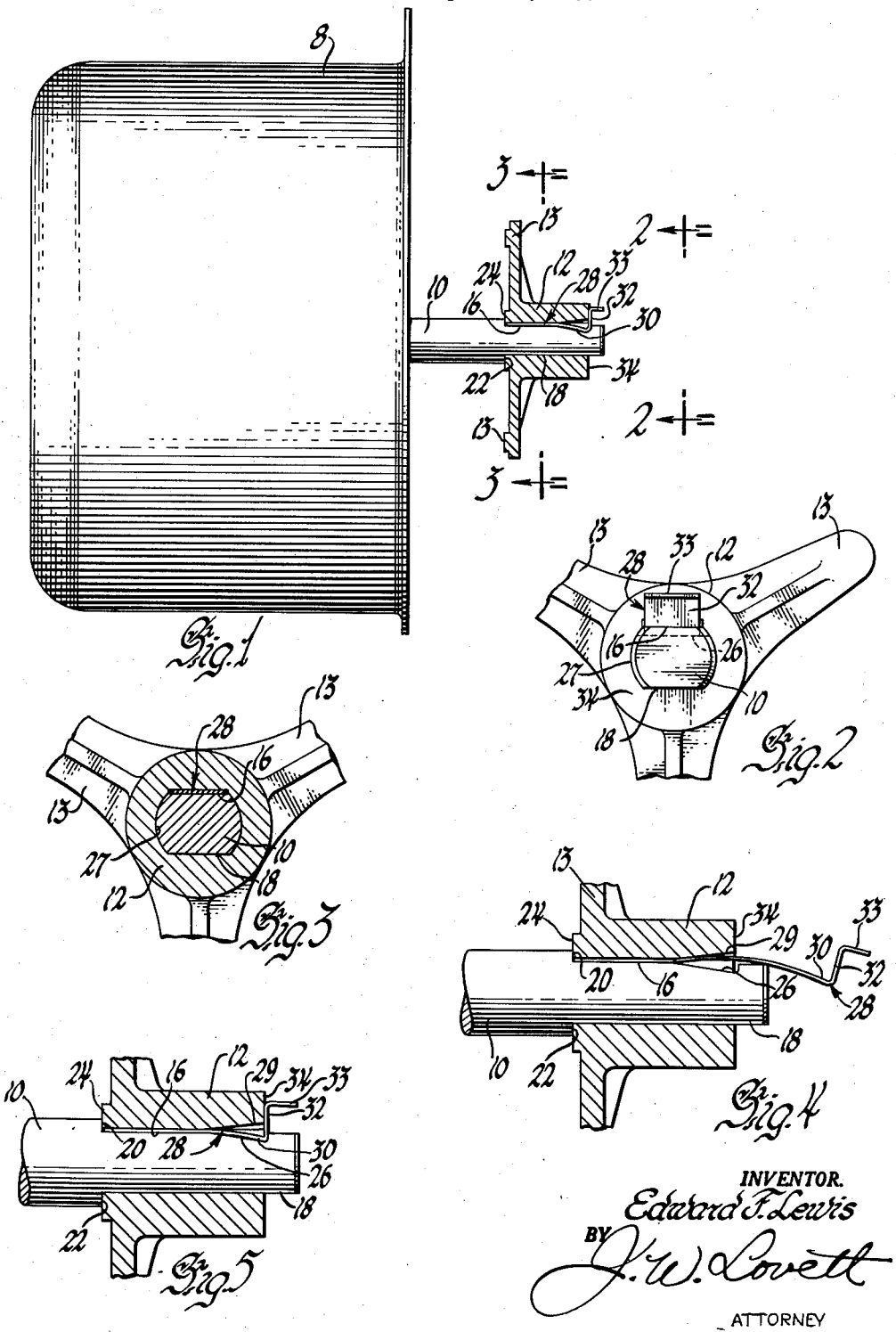

2,945,712

HUB AND SHAFT ARRANGEMENT

Edward F. Lewis, Newfane, N.Y., assignor to General Motors Corporation, Detroit, Mich., a corporation of Delaware Filed Apr. 17, 1957, Ser. No. 653,440

4 Claims. (Cl. 287—53)

This invention relates to hub and shaft arrangements and more particularly to arrangements in which hub elements are locked in non-rotative arrangement with associated shafts.

The invention is herein illustrated as applied to a motor shaft adapted to drive the rotor of a blower; but it will be apparent that the invention may also be utilized in attaching knobs, handles, gears or other rigid devices driven or acting as drivers as associated with shafts. It is also apparent that the term "hub element" as used herein may refer to a sleeve or a plate cam of either constant or varying thickness as measured parallel with the shaft to which it is affixed.

An object of the invention is to provide an improved hub and shaft arrangement in which a hub element and a shaft element may positively be locked in non-rotative relation. Another object of the invention is to provide a hub element and a shaft element which may be easily joined together in non-rotative relation and quickly detached from each other as occasion demands.

A feature of the present invention pertains to a spring member interposed between a flat surface on a shaft element and a hub element mounted on the shaft which member serves to lock the two elements together without reliance upon friction.

These and other important features of the invention will now be described in detail in the specification and then pointed out more particularly in the appended claims.

In the drawings:

Figure 1 is an elevation view, partially in section, showing a motor and its shaft to which a rotor is attached by employing the present invention;

Figure 2 is an enlarged end view of the shaft element and a part of the hub element shown in Figure 1;

Figure 3 is a section view taken along the line 3—3 in Figure 1 and drawn to a larger scale;

Figure 4 is an enlarged view of a portion of the subject matter shown in Figure 1, the parts being in their unlocked positions; and Figure 5 shows the shaft and hub elements of Figure 1 locked in their operative positions.

In Fig. 1 of the drawings, an electric motor 8 is depicted having a shaft element 10 to which is affixed the rotor or hub element 12 adapted to support the blades of a blower. The rotor is not fully described herein as it obviously has no specific structure material to the description of the present invention. The drawings, however, do depict diverging arms 13 which are integral with the rotor structure.

The shaft element 10 is milled to provide two opposed flat surfaces 16 and 18. These surfaces extend from the end of the shaft element and terminate at shoulders 20 and 22, respectively. A recess 26 is formed in the shaft element and extends inwardly from the surface 16. This recess is spaced from the shoulder 20 as seen in the drawings.

The hub element 12 bears an aperture 27 which is enlarged at one side and one end as at 29. In assembly of the parts the aperture enlargement 29 faces the recess 26 and one end surface of the hub element 12 designated at 34 extends radially from the deepest portion of the recess 26.

A spring element 28 is made in the form depicted in Fig. 4 and comprises an intermediate arched portion 30, a shoulder or end portion 32 together with a lip 33. Preferably the arched portion of the spring member is of such length that it terminates short of the shoulder 20 when the parts are locked together.

In placing the hub element 12 upon the shaft element 10, a space exists between the flat surface 16 and the hub element for the insertion of the spring member 28. With the hub element 12 mounted on the shaft element 10 and engaging the shoulders 20 and 22 of the latter, one end of the spring member 28 is inserted between the two elements as shown in Fig. 4. As the spring member 28 is further inserted and partially distorted on straightened, it will finally snap into its place within the recess 26 and the end portion 32 of the spring member will contact the end surface 34 of the hub element as a stop. This securely locks the shaft element and hub element in relation to each other and as shown in Fig. 5. In the event the hub element is to be removed from the shaft element or vice versa, the lip 33 may be manipulated to lift the intermediate portion 30 from the recess 26 permitting relative axial movement of the hub and shaft. The purpose of the aperture enlargement 29 is to provide additional leeway for the spring member 28 during assembly or disassembly. This is not necessary but is preferred.

It will be noted that the assembly comprises parts which are locked together in such a way as not to rely upon frictional forces insofar as axial displacement is concerned.

I claim:

1. A hub and shaft arrangement including a shaft element and a rigid hub element mounted on said shaft element, the latter having a flat surface on one side, a shoulder on said shaft element extending outwardly from said flat surface and engaging one end of said hub element, a recess spaced from said shoulder and extending into said shaft element from said surface, a spring member interposed between said flat surface and said hub element with an intermediate portion extending into said recess and an end portion engaging the other end of said hub element as a stop, and said recess being proportioned for flexing of said intermediate portion therein.

2. A hub and shaft arrangement including a shaft element having a flat surface on one side, a shoulder extending outwardly from said flat surface and a recess spaced from said shoulder, a rigid hub element mounted on said shaft element and having one end engaging said shoulder, a spring member interposed between said flat surface and said hub element with an intermediate portion resiliently extending into said recess and an exposed end portion contacting the other end of said hub element, and said recess being proportioned for flexing of said intermediate portion therein.

3. A hub and shaft arrangement including a shaft element with two parallel flat surfaces and a shoulder extending outwardly from one of said flat surfaces, a recess spaced from said shoulder and extending into said shaft element from said one surface, a rigid hub element on said shaft element with one end surface engaging said shoulder, a spring emember interposed between said one flat surface and said hub element with an intermediate portion extending into said recess as a lock and an end portion of said spring member engaging the other end surface of said hub element as a stop, and said recess being proportioned for flexing of said intermediate portion therein.

4. A hub and shaft arrangement including a shaft element having two opposed flat surfaces at one end, shoulders on said shaft element each extending outwardly from one of said flat surfaces, a recess spaced from one of said shoulders and extending into said shaft element from one of said surfaces, a rigid hub element mounted on said shaft with one end surface contacting said shoulders, a spring member interposed between said flat surface having the recess and said hub member, an intermediate portion of said spring member extending into said recess, an end portion of said spring member engaging the other end surface of said hub element, the said recess being of such dimension as to provide for flexure of said intermediate portion, and an extension of said spring member constituting a lip exposed to view to draw said intermediate portion from said recess for the purpose of disassembly.

References Cited in the file of this patent

UNITED STATES PATENTS

| | | | |
|---|---|---|---|
| 668,882 | O'Meara | Feb. 26, | 1901 |
| 893,066 | Fletcher et al. | July 14, | 1908 |
| 2,252,855 | Lasch | Aug. 19, | 1941 |
| 2,293,615 | Murphy | Aug. 18, | 1942 |
| 2,655,963 | Dell | Oct. 20, | 1953 |

FOREIGN PATENTS

| | | | |
|---|---|---|---|
| 105,572 | Australia | Oct. 19, | 1938 |
| 325,410 | Great Britain | Feb. 20, | 1930 |
| 379,459 | Germany | Aug. 24, | 1923 |
| 735,482 | Germany | May 15, | 1943 |